United States Patent [19]
Yamamoto et al.

[11] Patent Number: 5,886,139
[45] Date of Patent: Mar. 23, 1999

[54] PROCESS FOR PRODUCING POLYACETAL COPOLYMER

[75] Inventors: Kaoru Yamamoto; Akira Nakai, both of Shizuoka, Japan

[73] Assignee: Polyplastics Co., Ltd., Japan

[21] Appl. No.: 835,932

[22] Filed: Apr. 11, 1997

[51] Int. Cl.⁶ .................................................. C08G 59/68
[52] U.S. Cl. ........................ 528/410; 528/417; 528/418; 524/718; 524/720; 524/726; 524/741; 524/773; 524/779
[58] Field of Search .................................. 528/410, 417, 528/418; 524/718, 779, 773, 720, 741, 726

[56] References Cited

U.S. PATENT DOCUMENTS 3,221,059  11/1965  Fukui et al. ............................. 528/410
3,274,129  9/1966  Bailey, Jr. ............................... 528/410

FOREIGN PATENT DOCUMENTS 0 503 394 A2  9/1992  European Pat. Off. .
0 638 599 A2  2/1995  European Pat. Off. .
0 699 695 A2  3/1996  European Pat. Off. .

Primary Examiner—Melvyn I. Marquis
Attorney, Agent, or Firm—Nixon & Vanderhye P.C.

[57] ABSTRACT

To economically produce a polyacetal copolymer excellent in properties including thermal stability by copolymerizing trioxane as the main monomer through simple steps, a polyacetal copolymer is produced by copolymerizing trioxane as the main monomer using a nonvolatile protonic acid catalyst as a polymerization catalyst until the conversion reaches at least 60% (based on all monomers), and then vaporizing unreacted monomers to separate, remove, and recover the same from the polymerization system to thereby reduce the residual monomer content of the polymerization system to 5% by weight or lower.

29 Claims, No Drawings

PROCESS FOR PRODUCING POLYACETAL COPOLYMER

BACKGROUND OF THE INVENTION

1. Field of the Invention

This invention relates to a process for the production of a polyacetal copolymer. More particularly, this invention relates to a process for economically producing a polyacetal copolymer excelling in such qualities as thermal stability by a simple procedure of copolymerizing trioxane as a main monomer and a comonomer copolymerizable therewith in the presence of a specific nonvolatile protonic acid catalyst as a polymerization catalyst thereby enabling unaltered monomers occurring in the latter stage or the final stage of the polymerization to be efficiently and economically removed from the polymerization system and recovered for reuse.

2. Description of the Prior Art

As a process for the production of a polyacetal copolymer, the cationic polymerization using trioxane as a main monomer and a cyclic ether or cyclic formal possessing adjoining carbon atoms as a comonomer has been known. As cationically active catalysts for use in the polymerizations of this class, Lewis acids, particularly halogenides of boron, tin, titanium, phosphorus, and antimony such as, for example, boron trifluoride, tin tetrachloride, titanium tetrachloride, phosphorus penta-chloride, phosphorus pentafluoride, bismuth pentafluoride, and antimony pentafluoride, and such compounds as complex compounds or salts thereof, protonic acids such as, for example, perfluoro-alkyl sulfonic acids and perchloro acids, esters of the protonic acids, particularly esters of perchloro acids with lower aliphatic alcohols such as, for example, perchloro acid-tertiary butyl esters, protonic anhydrides, particularly mixed anhydride of perchloro acids with lower aliphatic carboxylic acids such as, for example, acetyl perchlorate, or trimethyl oxonium hexafluorophosphate, triphenylmethylhexafluoroarsenate, acetyl tetrafluoroborate, acetyl hexafluorophosphate, and acetyl hexafluoroarsenate have been proposed.

Among other catalytically active catalysts mentioned above, boron trifluoride or a coordination compound of boron trifluoride with an organic compound such as, for example, an ether is most widely utilized on a commercial scale as the catalyst for the polymerization having trioxane as a main monomer.

No matter which catalyst may be adopted, the rate of polymerization decreases so suddenly in the latter stage of polymerization as to render it extremely difficult to obtain quickly a yield of polymerization approximating closely to 100%. The polymerization consumes a very long time and, therefore, proves inefficient. In the latter stage of polymerization, the catalyst rather predominantly manifests an action of promoting the decomposition of the formed polymer and results in not only decreasing the molecular weight but also degrading such qualities as thermal stability. When the amount of the polymerization catalyst is increased, the overall rate of polymerization is indeed exalted. This increase, however, does not necessarily prove a proper measure for the overall process of polymerization because the catalyst in the increased amount further aggravates the degradation of the quality of the produced crude polymer and calls for a complicated stabilizing treatment in the latter stage.

The production of a polyacetal copolymer, therefore, has heretofore resorted generally to a method which comprises stopping the polymerization at a stage of relatively low conversion by adding to the polymerization system a solution containing an agent for inactivating the catalyst, washing the unaltered monomer remaining in the polymerization system, recovering the monomer in a refined form, and putting the recovered monomer to reuse. Since the unaltered monomer washed in this method is recovered in the form of a solution containing the monomer at a relatively low concentration, the reuse thereof necessitates use of a complicated process and consumption of energy for the sake of separation and purification. When the recovery of the unaltered monomer is abandoned, the unaltered monomer is completely wasted. In any event, the unaltered monomer turns out to be an economic burden.

SUMMARY OF THE INVENTION

The present inventors, conscious of the true state of prior art mentioned above, have aimed to obtain a crude polymer of high quality and ultimately attain economic production of a polyacetal copolymer highly stable even thermally by a simple process and have particularly aimed to permit economic recovery of the unaltered monomer fit for reuse by selecting a polymerization catalyst and ensure ultimate production of polyacetal polymer which reconciles quality and economic effect.

In the copolymerization using trioxane as a main monomer, the latter stage or the terminal stage in which the conversion exceeds 60%, for example, witnesses such a marked decrease in the rate of polymerization that an extremely long time is required for attaining a yield of polymerization close to 100%. In the terminal stage of polymerization, the reaction of decomposition becomes extremely predominant relatively and brings about such qualitative problems as lowering molecular weight, heavily increasing an unstable polymer, and necessitating a complicated stabilizing treatment. The present inventors, with due respect to this fact, have conceived an idea of vaporizing unaltered trioxane and other monomers before the reaction of polymerization is completed and after the conversion has reached a specific level and separating and recovering them from the polymerization system and have confirmed through a test that this method enables the separation and collection of the vaporized monomers to be implemented economically, the collected vaporized monomers to be put to reuse either directly or only through an extremely simple refining treatment, the possible impairment of quality of the polymer by the heavy decomposition in the terminal stage of polymerization to be precluded, the recovery and reuse of unaltered monomers to be attained simply and economically, and the prospective effects of both quality and economy to be realized as compared with the conventional method which resides in washing the polymerization system with a large amount of a solvent and collecting the unaltered monomers in the form of a solution containing the monomers at low concentrations.

The present inventors have tested and studied this concept from various angles to learn that since the standard boron trifluoride type catalyst heretofore in popular use is volatile inherently, the vapor formed when the unaltered monomers are vaporized in the terminal stage of polymerization entrains the catalyst, suffers the unaltered monomers to polymerize anew in the line for vaporization and collection and quickly clog this line, and consequently disrupts the vaporization and collection of the unaltered monomers. They have further continued various studies on this problem and consequently have been ascertained that the use of a specific nonvolatile catalyst of special choice enables the unaltered monomers to be smoothly vaporized and collected by preventing the vaporized monomers from entraining the catalyst during the course of vaporization and collection and further that this catalyst is characterized by possessing an ability to inhibit the formation of a formate group (—OCH=O) which constitutes itself an unstable terminal of the formed polymer. They have perfected this invention as a result.

Specifically, this invention concerns a method for the production of a polyacetal copolymer by the copolymerization of trioxane as a main monomer and a cyclic ether or cyclic formal possessing at least one carbon-carbon bond as a comonomer, characterized by using an nonvolatile protonic acid catalyst as a polymerization catalyst thereby polymerizing the monomers until a conversion of at least 60% (based on the total amount of monomers) and subsequently vaporizing the unaltered monomers and separating and recovering the vaporized monomers from the polymerization system thereby enabling the amount of residual monomers in the polymerization system to fall below 5% by weight based on the amount of the polymer.

The invention, in other words, is directed to a process for producing a polyacetal copolymer, comprising the steps of copolymerizing trioxane as the main monomer with a cyclic ether or a cyclic formal, as a comonomer, each having at least one carbon-carbon bond, using a non-volatile protonic acid catalyst as a polymerization catalyst to reach a polymerization degree of at least 60%, based on all monomers, and then vaporizing unreacted monomers to separate, remove and recover them from the polymerization system to thereby reduce the remaining monomer content of the polymerization system to 5% by weight or lower based on the polymer.

DETAILED DESCRIPTION OF THE INVENTION

Now, this invention will be described in detail below.

As is clear from the description given above, the method of this invention for the copolymerization of trioxane is primarily characterized by using an nonvolatile protonic acid catalyst. The nonvolatile protonic acids which are advantageously used in this invention include heteropoly acid or acidic salts thereof and isopoly acid or basic salts thereof, for example.

The term "heteropoly acid" as used herein refers generally to such poly acids as are formed by the dehydration condensation of oxygen acids of different species. The heteropoly acid possesses a uninuclear or multinuclear complex ion which has a specific hetero element at the center thereof and allows condensing acid groups to be condensed by sharing an oxygen atom. The heteronuclear condensate acids of this class can be generally represented by the general formula (1).

$$H_x[M_m \cdot M'_n O l] \cdot y H_2 O \qquad (1)$$

[wherein M represents a central element formed of either or both of P and Si, M' represents at least one coordination element selected from among W, Mo, and V, l is 10 to 100, m is 1 to 10, n is 6 to 40, x is an integer of at least 1, and y is 0 to 50].

The heteropoly acid which is particularly effective as a polymerization catalyst for this invention has a composition of the foregoing formula (1) such that the central element (M) is formed of at least one element selected between P and Si and the coordinate element (M') is formed of at least one element selected from among W, Mo, and V (particularly preferably between W and Mo).

Further, the acid salt of a composition of the formula (1) such that the hydrogen atoms, $H_x$, are partly substituted by a varying metal element can be used as a catalyst for this invention.

As concrete examples of the heteropoly acid of this description, phosphomolybric acid, phosphotungstic acid, phosphomolybdotungstic acid, phosphomolybdovanadic acid, phosphomolybdotungstovanadic acid, phosphotugstovanadic acid, silico-tungstic acid, silicomolybdic acid, silicomolybdotungstic acid, and silicomolybdotungstovanadic acid may be cited. Among other heteropoly acids cited above, silicomolybdic acid, silicotungstic acid, phosphomolybdic acid, and phosphotungstic acid prove particularly advantageous. The heteropoly acids are generally known in such forms as $\alpha_0$ type, $\beta_{II}$ type, and $\beta_{IV}$ type. In terms of polymerization activity, the $\alpha_0$ type and the $\beta_{IV}$ type prove favorable and the $\alpha_0$ type proves particularly favorable.

The isopoly acid for the nonvolatile protonic acid catalyst of this invention is otherwise referred to as an isopoly acid, a homonuclear condensate acid, or a homomultiple acid. It is a high molecular inorganic oxygen acid which is formed of the condensate of an inorganic oxygen acid possessing one pentavalent or hexavalent metal element as represented by the following general formula (2) or (3).

$$xM\_hu\ I_2O \cdot p M^V{}_2O_5 \cdot y H_2O \qquad (2)$$

$$xM'_2O \cdot p M^{VI}O_3 \cdot y H_2O \qquad (3)$$

[wherein $M^I$ represents a hydrogen atom, $M^V$ represents V, Nb, or Ta, each belonging to Group V in the periodic table of the elements, $M^{VI}$ represents Cr, Mo, W, or U, each belonging to Group VI in the periodic table of the elements, p represents an integer of 1 or over, x represents an integer of 1 or over, and y represents a numeral of 0 to 50].

The isopoly acid is a protonic acid which is prepared by any of various methods such as, for example, a method which comprises treating the solution of an isopoly acid salt corresponding to the formula (2) or (3) mentioned above such as, for example, an isopolymolybdate, an isopolytungstate, or isopolyvanadate, with an ion-exchange resin and a method which comprises concentrating the solution, adding a mineral acid to the concentrated solution, and subjecting the resultant mixture to ether extraction. The acid salt of a form which results from partial substitution of the protons ($M^I$: hydrogen) by a varying metal element can be also used as the catalyst of this invention. Particularly, an isopoly acid of the formula (3) or an acid salt thereof proves favorable.

As concrete examples of this isopoly acid, isopoly tungstic acids like paratungstic acid and metatungstic acid, isopoly molybdic acids like paramolybdic acid and metamolybdic acid, and metapoly vanadic acid and isopoly vanadic acid may be cited. Among other isopoly acids, isopoly tungstic acid proves particularly favorable.

Preferably, for the purpose of enabling the reaction to proceed uniformly, the nonvolatile protonic acid catalyst mentioned above is used as diluted with a solvent incapable of exerting any adverse effect on the polymerization and then added to the monomers. As the diluent, ethers (such as, for example, n-butyl ether) which are inert organic solvents capable of dissolving the protonic acid catalyst mentioned above can be used. The diluent does not need to be limited to these ethers. Linear acetals (such as, for example, methylal) which are usable as the chain transfer agent for the adjustment of molecular weight as described specifically hereinafter and alcohols (such as, for example, methanol) can be also usable as the diluent. The diluent can be used without causing any noticeable trouble because it is effectively used in an extremely small amount based on the amount of the monomers. It can be added in conjunction with the comonomer to the polymerization system as dissolved in advance in part or the whole of the comonomer as will be described specifically herein below. Though this measure proves favorable in respect that the otherwise inevitable inclusion of other solvent is absent, it is advantageous to cool thoroughly the comonomer containing the dilutent and preventing it from being homopolymerized before it is added to and mixed in the polymerization system as by keeping it at the lowest allowable temperature, i.e. at least below normal room temperature, until immediately before the addition to the polymerization system.

Since the protonic acid catalyst described above possesses an extremely high-polymerizing activity, it manifests the expected effect in an extremely small amount. This amount is generally in the range of 0.1–50 ppm, preferably 0.5–20 ppm, and particularly preferably 0.5–10 ppm, based on the total amount of the monomers to be polymerized.

This invention carries out the polymerization of the monomers by the use of the nonvolatile protonic acid catalyst mentioned above until the conversion reaches a level of not less than 60% of the total amount of the monomers supplied.

As the main monomer for the polymerization, this invention uses trioxane which is a cyclic trimer of formaldehyde.

The comonomer to be used in this invention is a cyclic ether or cyclic formal which possesses at least one carbon-carbon bond. It may be any of the known comonomers which have been heretofore used for the copolymerization with trioxane.

As concrete examples of the cyclic ether or cyclic formal, such cyclic compounds as 1,3-dioxolan, diethylene glycol formal, 1,4-butane diol formal, 1,3-dioxane, ethylene oxide, propylene oxide, and epichlorohydrin may be cited. A cyclic ether or cyclic formal which possesses an unsaturated-bond group is also usable. As the comonomer for enabling the copolymer to form a branched or cross-linked molecular structure, such compounds as, for example, alkylene-diglycidyl ethers or diformals like butane diol diglycidyl ether and butane diol dimethylidene glyceryl ether which possess two or more cyclic ether groups or cyclic formal groups which possess two or more cyclic ether groups or cyclic formal groups can be used. It is permissible to use two or more such comonomers in the form of a mixture, depending on the purpose of the copolymerization.

As concrete examples of the comonomer which is used particularly advantageously herein, such cyclic ethers or cyclic formals as 1,3-dioxolan, diethylene glycol formal, 1,4-butane diol formal, and ethylene oxide may be cited.

The amount of the comonomer to be used in this invention is in the range of 0.1–20 mol %, preferably 0.2–10 mol %, based on the amount of trioxane. If the amount of the comonomer is unduly small, the unstable terminal part will increase and the stability will be degraded. Conversely, if this amount is unduly large, the formed copolymer will gain in softness and suffer a decrease of melting point. Part or the whole of the comonomer may be concurrently used as a diluent for the protonic acid catalyst as described above.

The method of polymerization according to this invention allows the polymerization system, depending on the object of production, to incorporate therein any of the known chain transfer agents such as, for example, low molecular linear acetals like methylal, alcohols, and esters for the purpose of adjusting the polymerization degree. This chain transfer agent may be used concurrently as the diluent for the protonic acid catalyst mentioned above. The polymerization system is preferred to be in a state in which such impurities as formic acid and water which possess active hydrogen are substantially absent. The allowable amounts of these impurities are each not more than 30 ppm, preferably not more than 20 ppm, and particularly preferably not more than 10 ppm.

The polymerization of this invention can be carried out by the same apparatus and the same method as have been heretofore used for the known copolymerization of trioxane. This method may be batchwise or continuous in the form of process. The method which uses liquid monomers and, in consequence of polymerization, forms a polymer in the form of solid granules is generally adopted.

As the polymerization apparatus for this invention, popular reaction columns adapted to permit temperature adjustment and provided with a stirrer can be used for the polymerization performed batchwise and cokneaders, biaxial screw type continuous extruding and mixing devices, biaxial paddle type continuous mixing devices, and continuous polymerizing devices heretofore proposed for copolymerization of trioxane can be used for the polymerization performed continuously. Two or more types of polymerizing devices may be used in a combined form.

Properly, the polymerization temperature is in the range of 60°–120° C., preferably in the range of 65°–110° C.

This invention is characterized by vaporizing the unaltered monomers remaining in the polymerization system in the stage in which the velocity of the polymerization reaction performed by the method described above decreases the reaction of decomposition grains in relative predominance and separating and removing the vaporized monomers from the polymerization system. The separation of the unaltered monomers by the vaporization mentioned above is carried out after the conversion of polymerization has reached a level of at least 60%, preferably a level in the range of 70–90%, and particularly preferably in the range of 75–85%, based on the total amount of monomers.

If the separation of the unaltered monomers is performed in a stage in which the conversion is unduly small, though it produces favorable effects on the quality of the product, such economic disadvantages as necessitating an unduly long time for recover and reducing the yield of the produced polymer will ensue. If the separation of the unaltered monomers is performed in a state in which the conversion is unduly large, though the operation of the separation itself is accomplished in a short span of time and the yield of the produced polymer is high, the reaction of decomposition will arise in the subsequent stage to produce an adverse effect on the quality of the product.

From this point of view, the present invention carries out the separation of the unaltered monomers appropriately after the conversion of polymerization has reached a level in the range specified above. This level is properly selected in the range so as to suit the object of polymerization.

This invention is characterized, as described above, by vaporizing the unaltered monomers in the reaction system and removing the vaporized monomers therefrom. The monomer mixture of this invention having trioxane as a main component manifests high volatility at the polymerization temperature. The unaltered monomers, therefore, can be vaporized and removed from the reaction system with unexpected simplicity in the prescribed stage of polymerization by subjecting the reaction system to reduced-pressure aspiration or passing an inert carrier gas such as nitrogen gas through the reaction system or using these two measures in combination. This invention owes the separation of the unaltered monomers by the vaporization described above to the use of the nonvolatile protonic acid as the polymerization catalyst. If such a volatile boron trifluoride type catalyst heretofore in popular use is adopted, since this catalyst is entrained by the vaporized and separated monomers, the monomers will polymerize in the line for vaporization and separation and the produced polymer will clog the line for separation and collection to the extent of bringing about such disadvantages as disrupting smooth progress of the operation. According to the method of this invention, since the unaltered monomers are separated and collected in a gasified state without suffering inclusion of extraneous substances such as a solvent, they can be collected and directly put to reuse. The collected monomers at least can be prepared solely by a very simple refining treatment for reuse. When they are added to the process for refining freshly supplied trioxane, the energy required for recovering and refining them can be reduced to a great extent. The present method, therefore, can attain recovery and reuse very economically while avoiding the disadvantages of complicated recovery and refinement treatments such as concentration which demand consumption of huge energy unlike the conventional method which separates and collects unaltered monomers in the form of a solution containing the monomers in a low concentration by washing.

This invention separates and removes the unaltered monomers from the polymerization system at least until the residual content of unaltered monomers in the polymerization reaches a level of not more than 5% by weight, preferably not more than 3% by weight, and further preferably not more than 2% by weight, based on the amount of the polymer. Naturally, the final residual monomers are preferred to be in the smallest possible amounts because they are simply set aside as a waste. An attempt to decrease the amounts to nil calls for a long time and rather proves uneconomical and induces decomposition of the polymer as well. The reduction of the amounts does not need to be compelled but may rather be discontinued at a proper level in the range specified above. The method of this invention has the advantage of repressing the decomposition of the polymer because the latent heat of evaporation owing to the vaporization of the monomers effectively represses the rise of temperature due to the accumulation of the heat of reaction in the polymer system and even brings about a decrease of temperature.

The method of this invention is only required to satisfy the basic requirements for construction described above and can be worked in various modes.

For example, a method which comprises adopting such a continuous polymerizing device as mentioned above, setting for the outlet of the device such conditions as allow the conversion to reach a prescribed level, disposing a mechanism for decompression, aspiration, or flow of a current of an inert gas at or near the outlet, and consequently performing vaporization and separation of the unaltered monomers, a method which comprises using polymerizing devices at two or more stages, performing in the polymerizing device of the former stage the polymerization until the prescribed conversion, then transferring the reaction system to the polymerizing device of the latter stage, and continuing the polymerization further therein and, at the same time, vaporizing and separating the unaltered monomers, and a method which comprises inactivating the catalyst in the presence of such a catalyst-inactivating agent as will be described specifically herein below and, at the same time, performing the vaporization and removal of the unaltered monomers may be available. Other methods may be adopted as suitable combined.

For the vaporization and the separation of the unaltered monomers in this invention to be carried out efficiently, the polymer in which the unaltered monomers are so treated is preferred to be crushed so as to form a renewed surface. The polymerizing device in use, for this purpose, is provided preferably in the latter part thereof with a mechanism capable of crushing the polymer particles and forming renewed surfaces or a mechanism capable of performing a crushing treatment on the polymer prior to the vaporization of the unaltered monomers. The polymerizing device may be otherwise provided with a mechanism capable of crushing and stirring the polymer and operated to effect the vaporization and removal simultaneously with the crushing and the surface renewal. From this point of view, the polymer in which the unaltered monomers are to be treated is preferred to be so crushed that the polymer particles having diameters of not more than 3 mm assume a proportion of not less than 90% of all the polymer particles in order that the unaltered monomers may be smoothly vaporized and removed.

The product of the polymerization reaction from which the vaporized unaltered monomers have been removed is then made to add a catalyst-inactivating agent for the purpose of inactivating the catalyst contained therein. The inactivation of the catalyst is accomplished by using the inactivating agent in a small amount by a method described specifically herein below. The product now containing the inactivated catalyst does not need to be washed but may be directly subjected to a heat treatment. Consequently, a polyacetal copolymer having high thermal stability is obtained.

The treatment for inactivating the catalyst contemplated by this invention is implemented by exposing the product of copolymerization to a basic gas or by combining the product with a solution containing a basic compound-in a small amount (for example, not more than 7% by weight, preferably not more than 5% by weight, based on the amount of the polymer) and mixing them.

As concrete examples of the basic gas to be effectively used in the treatment of inactivation of this invention, ammonia and/or an amine compound may be cited. The amine compound to be used in this case is preferred to have a low molecular weight and a low boiling point because it is brought into contact in a gaseous form with the formed crude polymer. Appropriately, the boiling point is not higher than 150° C. To be more specific, the compounds which are represented by the general formulas, $R_1NH_2 \cdot R_1R_2NH$ and $R_1R_2R_3N$ (wherein $R_1$, $R_2$, and $R_3$ independently represent an alkyl group of not more than 4, preferably not more than 2, carbon atoms or an alcohol group) are preferred examples. An amine compound having a relatively high boiling point can be used as diluted with a carrier gas as described specifically herein below so that it may be allowed to contact in a gaseous form with the crude polymer.

As concrete examples of the amine compound answering the description given above, methyl amine, dimethyl amine, trimethyl amine, ethyl amine, diethyl amine, triethyl amine, butyl amine, dibutyl amine, tributyl amine and alcohol amines corresponding thereto (such as, for example, trimethanol amine) may be cited. Among them, methyl amine, dimethyl amine, trimethyl amine are particularly preferred.

The basic gas mentioned above may be used in its inherent gaseous form or it may be diluted with a carrier gas and used in the form of a mixed gas for contact with the formed polymer. The carrier gas, though not specifically defined, is preferred to be an inert gas. Nitrogen gas or other organic gases are examples.

The method for establishing contact between the basic gas and the formed crude polymer does not need to be particularly limited but may be effected by any of the method which are capable of causing the basic gas to contact the formed copolymer particles thoroughly. For example, a method which comprises causing the crude polymer to be thoroughly stirred and mixed in the atmosphere of the basic gas, a method which comprises blowing the basic gas counter to the stream of the crude copolymer, or a method which comprises causing the basic gas to flow in a circulating manner between the adjacent particles of the crude polymer bed may be adopted.

The amount of the basic gas to be used in this invention is required to be sufficient for inactivating the catalyst by neutralization. It is preferred to be not less than 10 mols per mol of the catalyst in use.

As the diluent, this invention allows use of a varying basic compound in the form of a solution or dispersion containing the compound only in a small amount. The amount of the basic compound is required to be sufficient for thoroughly inactivating the catalyst by neutralization. Preferably, the inactivating agent is added in the form of an inactivating agent solution having the inactivating agent dissolved or dispersed in water or an organic solvent.

In this case, the amount of the inactivating agent solution to be added is in the range of 0.3–7% by weight, preferably 0.5–5% by weight, based on the amount of the formed crude polymer. The inactivating agent solution, notwithstanding the small amount of addition, brings about perfect inactivation of the catalyst when it is amply stirred and mixed with the crude polymer and is consequently enabled to take advantage of the properties of the polymerization catalyst being used.

The inactivating agent to be effectively used in this method may be any of the known basic substances. As concrete examples of the inactivating agent, ammonia, various amine compounds, or oxides, hydroxides, organic acid salts, or inorganic acid salts of alkali or alkaline earth metals, and trivalent phosphorus compounds may be cited. These inactivating agents may be used advantageously either singly or in the form of a mixture of two or more members.

The amine compounds which are effectively usable herein include primary, secondary, and tertiary aliphatic amines and aromatic amines such as, for example, methyl amine, dimethyl amine, trimethyl amine, ethyl amine, diethyl amine, triethyl amine, butyl amine, dibutyl amine, and tributyl amine, and alcohol amines corresponding thereto (such as, for example, triethanol amine), and aniline, diphenyl amine, heterocyclic amine, and hindered amines (such as, for example, piperidine derivatives), for example.

As concrete examples of the alkali or alkaline earth metal compound, oxides, hydroxides, carbonates, bicarbonates, phosphates, borates, silicates and other inorganic weak acid salts, acetates, oxalates, formates, benzoates, terephthalates, isophthalates, phthalates, aliphatic acid salts and other organic acid salts of alkali metals or alkaline earth metals, and alkoxides and phenoxides like methoxides, ethoxides, n-butoxides, sec-butoxides, tert-butoxides may be cited. Among other alkali or alkaline earth metal compounds mentioned above, hydroxides, carbonates, and fatty acid salts are used particularly favorably. As concrete examples of the alkali metal or alkaline earth metal, lithium, sodium, potassium, cesium, magnesium, calcium, strontium, and barium may be cited. Among other alkali metals and alkaline earth metals mentioned above, lithium, sodium, potassium, magnesium, and calcium is used particularly favorably. To be more specific, calcium hydroxide, magnesium hydroxide, sodium carbonate, calcium acetate, calcium stearate, and calcium hydroxystearate prove particularly advantageous.

As the solvent for the preparation of the inactivating agent, water or an organic solvent is used. As concrete examples of the organic solvent, alcohols such as methanol and ethanol, ketones such as ethyl ketone and acetone, aromatic compounds such as benzene, toluene, and xylene, and saturated hydrocarbons such as cyclohexane, n-hexane, and n-heptane may be cited. The aqueous solution of such an organic solvent is used particularly favorably.

The method to be used for the addition of the inactivating agent solution to the crude polymer is not particularly limited. This solution, to be effectively dispersed and allowed to contact the crude polymer, is preferred either to be sprayed on the crude polymer or to be thoroughly stirred and mixed with the crude polymer.

When the solution containing the basic gas or basic compound in a small amount is added as the catalyst-inactivating agent to the formed crude polymer and enabled to inactivate the catalyst in the polymer, the crude polymer is preferred to be in the form of minute granules. The device for polymerization reaction, in this connection, is preferred to be capable of thoroughly crushing the polymer in a bulky form. Otherwise, the product resulting from the polymerization may be separately crushed with a crushing device before the addition of the inactivating agent thereto. Alternatively, the crushing and the stirring may be carried out simultaneously in the presence of the inactivating agent.

The crude polymer, while undergoing the inactivating treatment, is preferred to have a particle size distribution such that at least 90% of the whole particles have diameters of not more than 3 mm, preferably not more than 2 mm, and further preferably not more than 1 mm.

The temperature of the inactivating treatment is in the range of 0°–140° C., preferably 20°–120° C.

In this invention, the crude polymer which has added the catalyst-inactivating agent may be immediately subjected to a heat treatment for dissolution.

This heat treatment is preferred to be carried out in the presence of a stabilizing agent. The stabilizing agent usually has to be added at a freely selected time after the polymerization and before the heat treatment. It may be added simultaneously with the inactivating agent mentioned above or during the course of the heat treatment. In a preferred embodiment, the heat treatment is carried out in the presence of a small amount (0.1–7% by weight, for example) of water. This preferred embodiment is automatically accomplished when the inactivating agent is used in the form of an aqueous solution.

The stabilizing agent to be used as an important component herein may be any of the known substances such as, for example, various hindered phenol type antioxidants. Advantageously, a varying nitrogen-containing compound, metal oxide, or fatty acid salt is used in combination with this stabilizing agent.

As concrete examples of the hindered phenol type antioxidant, 2,6-di-t-butyl-4-methyl phenol, triethylene glycol-bis[3-(3-t-butyl-5-methyl-4-hydroxyphenyl) propionate], 1,6-hexane diol-bis-[3(3,5-di-t-butyl-4-hydroxyphenyl)propionate], tetrakis[3-(3,5-di-t-butyl-4-hydroxyphenyl)propionate] methane, N,N'-hexamethylenebis(3,5-di-t-butyl-4-hydroxyhydrocinnamide), 2-t-butyl-6-(3'-t-butyl-5'-methyl-2'-hydroxybenzyl)-4-methylphenyl acrylate, and 3,9-bis[2-{(3-t-butyl-4-hydroxy-5-methylphenyl)propionyloxy}-1,1'-dimethylethyl]-2,4,8,10-tetraoxaspiro[5,5]-undecane may be cited. Still, above-described hindered phenol antioxidant may exist at the time of copolymerization by adding in advance part or all of it into the monomer or the comonomer.

As concrete examples of the nitrogen-containing compound, dicyan diamide, melamine or derivatives thereof, urea or derivatives thereof, benzotriazole type compounds, piperidine type compounds (hindered amines), various polyamides or copolymers thereof (such as, for example, nylons 6, 12, 6/12, 6/66/610, and 6/66/610,12) may be cited.

The metal oxides are preferred to be oxides of alkaline earth metals. As concrete examples of the metal fatty acid salt, calcium salts or magnesium salts of higher fatty acids may be cited.

The stabilizers enumerated above have severally varying functions of their own. Preferably, two or more such stabilizers selected so as to suit a relevant object are used in combination.

The polymerization system at this stage, when necessary, may incorporate therein various other additives such as, for example, fillers like glass fibers, a crystallization promoter (seeds), and release agent.

The temperature of the heat treatment in this invention is in the range between the melting point of the formed copolymer and 250° C., preferably in the range between the melting point and 230° C. If the temperature exceeds 250° C., the disadvantage arises that the polymer will be degraded by decomposition. The device for this heat treatment, though setting no particular limit, is only required to be capable of kneading the molten polymer and furnishing a vent for the entrapped gas. As concrete examples of the heat-treating device, a uniaxial or multiaxial continuous extrusion kneading device provided with at least one venthole and a cokneader may be cited.

In this invention, the polymerization catalyst is completely inactivated and the inactivating agent incorporated in the polymerization system is enabled to promote the separation by decomposition of the unstable terminal part of the crude copolymer and the removal of the separated unstable terminal part together with other volatile substances through the vent part by this heat treatment, with the result that pellets of a stable polyacetal copolymer will be obtained. For this purpose, the venthole naturally is preferred to utilize decompression for allowing necessary aspiration of the discharging substances.

EXAMPLES

Now, this invention will be described specifically below with reference to working examples. Naturally, this invention is not limited to these examples. In the working examples and the comparative examples, the terms defined below and the physical magnitudes determined by the methods described below are used.

% or ppm: Invariably indicated on weight basis.

Conversion: Determined by washing a sample product of polymerization reaction with an inactivating agent solution, drying the washed sample polymer, and finding by calculation the ratio, % of the weight of the dried sample polymer to the total weight of monomers supplied.

Residual monomer content: Determined by washing a sample product with a prescribed inactivating agent solution, analyzing the washings by gas chromatography to determine the monomer content thereof, and finding by calculation the ratio, %, of the weight of the monomer to the weight of the crude polymer.

Melt index (MI): A melt index (g/10 min) determined at 190° C. This was rated as a characteristic value corresponding to a molecular weight. The magnitude of MI decreases in proportion as the molecular weight increases. The crude polymer resulting from polymerization was measured for MI in the presence of a stabilizer and the pellets resulting from melt extrusion were measured for MI in their unaltered form.

Alkali decomposition ratio (existing amount of unstable part): Determined by placing 1 g of crushed crude copolymer flakes or copolymer pellets in 100 ml of an aqueous 50% methanol solution containing 0.5% of ammonium hydroxide, heating the sample solution in a closed container at 180° C. for 45 minutes, subjecting the resultant solution to quantitative analysis to determine the amount of formaldehyde dissolved in the solution, and finding by calculation the ratio of the amount of formaldehyde to the weight of the polymer.

Ratio of weight loss by heating: Determined by heating 5 g of crude polymer flakes (containing powdered stabilizer) or copolymer pellets in air at 230° C. for 45 minutes and finding by calculation the ratio of weight loss.

Examples 1–8 and Comparative Examples 1 and 2

In a closed autoclave provided with a jacket capable of passing a heat medium and stirring vanes capable of generating mixing and crushing motions, trioxane containing 3.5% of a varying comonomer shown in Table 1 was placed, stirred, kept at an internal temperature of about 70° C. by passing hot water at 70° C. through the jacket, made to add a varying catalyst (dibutyl ether solution) shown in Table 1 in an amount shown in Table 1, and left polymerizing.

When the conversion reached a level of at least 60% (the value determined by a preliminary test under the same conditions entered in Table 1), the unaltered monomers were vaporized and separated from the reaction system by reduced-pressure aspiration or passage of a stream of nitrogen through a venthole formed in the upper part of the autoclave (jacketed and kept at 100° C.). The vaporized unaltered monomers were condensed and collected. The collected monomers showed virtually no sign of polymer formation. After the elapse of a prescribed time (Table 1), an aqueous 1% ammonia solution was added to the reaction system to stop the polymerization in process and, at the same time, wash the reaction system. The reaction system was analyzed for the unaltered monomer content and the yield of polymerization and the produced polymer was examined for properties. The results are shown in Table 1.

A polymerization was performed by following the procedure described above while using boron trifluoride (dibutyl etherate) instead as a catalyst for the purpose of comparison. When an attempt was made to vaporize and separate monomers meanwhile, a polymer was formed so amply in the venthole and the collecting device as to disrupt smooth collection of the unaltered monomers (Comparative Example 1).

When the polymerization described above was continued without being interrupted for vaporization and recovery of unaltered monomers by way of comparison (Comparative Example 2 in Table 1), the produced crude polymer was found to contain unaltered monomers in a large amount and manifest inferior properties.

The catalysts used in the working examples were as shown below.

Heteropoly acid (HPA)
HPA-1: Phosphomolybdic acid
HPA-2: Silicotungstic acid

HPA-3: Phosphotungstic acid
Isopoly acid (IPA)
IPA-1: Paratungstic acid
IPA-2: Metatungstic acid on the total amount of the monomers, with the jacket operated to pass hot water at 70° C. and the two rotary shafts rotated at a fixed rate, to effect copolymerization. The catalyst was prepared in the form of a solution in 3-dioxolan

TABLE 1

| | Polymerization conditions | | | | Residual monomer after recovery | | Polymer obtained | | | |
|---|---|---|---|---|---|---|---|---|---|---|
| | Catalyst | Amount (ppm; based on total amount of monomers) | Comonomer | Conversion (%) | Recovery of unaltered monomers | | (%; based on total amount of monomers) | Yield (%, based on total amount of monomers) | MI (g/10 min.) | Alkali decomposition ratio (%) | Weight loss by heating (%) |
| | | | | | Method | Time (min.) | | | | | |
| Ex. 1: | HPA-1 | 2 | 1,3-Dioxolan | 75 | Reduced pressure aspiration | 3 | 3 | 77 | 2.1 | 0.7 | 0.8 |
| Ex. 2: | HPA-1 | 4 | 1,3-Dioxolan | 84 | Reduced-pressure aspiration | 3 | 1 | 86 | 3.1 | 1.0 | 0.9 |
| Ex. 3: | HPA-1 | 3 | 1,4-Butane diol | 78 | Reduced-pressure aspiration | 4 | 2 | 81 | 2.5 | 0.8 | 0.8 |
| Ex. 4: | HPA-1 | 3 | 1,3-Dioxolan | 80 | Flow of nitrogen stream | 5 | 2 | 83 | 2.6 | 0.9 | 0.8 |
| Ex. 5: | HPA-2 | 3 | 1,3-Dioxolan | 75 | Reduced-pressure aspiration | 7 | 1 | 80 | 3.1 | 1.0 | 0.9 |
| Ex..6: | HPA-3 | 4 | 1,3-Dioxolan | 78 | Reduced-pressure aspiration | 5 | 1 | 82 | 2.8 | 0.9 | 0.8 |
| Ex. 7: | IPA-1 | 3 | 1,3-Dioxolan | 67 | Reduced-pressure aspiration | 10 | 1 | 74 | 3.5 | 1.0 | 1.0 |
| Ex. 8: | IPA-2 | 3 | 1,3-Dioxolan | 67 | Reduced-pressure aspiration | 5 | 3 | 69 | 2.8 | 0.9 | 0.9 |
| Comp. Ex. 1: | $BE_3$ etherate | 40 | 1,3-Dioxolan | 80 | Reduced-pressure aspiration | (1) Discontinued | Unrecoverable (18) | 81 | 4.1 | 2.5 | 2.1 |
| Comp. Ex. 2: | HPA-1 | 4 | 1,3-Dioxolan | 84 | No recovery attempted | (3) | (10<) | 87 | 3.3 | 1.2 | 1.1 |

Example 9

A polymerization was tried by following the procedure of Example 2 while adding about 10% of the monomers collected in Example 2 to freshly supplied monomers. In this example, the conversion was found to be 78% [cf. 84% obtained in Example 2 (using freshly supplied monomers)] and the unaltered monomers recovered could be reused in a substantially unmodified form.

Examples 10–15 and Comparative Examples 3 and 4

In a continuous mixing reaction device comprising a barrel formed in a cross section of the shape of two partly overlapping circles and provided on the outer side with a jacket for passing a heat (cooling) medium and two rotary shafts each provided with a multiplicity of stirring and propelling paddles and severally laid in the longitudinal direction, trioxane containing 2.5% of 1,3-dioxolan as a comonomer and 700 ppm of methylal as a molecular weight adjusting agent was continuously supplied via one end of the reaction device and, at the same time, a varying catalyst shown in Table 2 was continuously added in a feed volume calculated to total a varying amount shown in Table 2 based (about 1% based on the trioxane) and added as kept at about 0° C. to the polymerization system.

Then, the reaction product (found to possess an intermediate conversion shown in Table 2) emanating from the outlet of the polymerization device was introduced into a second continuous mixing device (jacketed and kept at 100° C.) and fed with nitrogen and, at the same time, subjected to reduced-pressure aspiration by means of a venthole (100° C.) provided in the second device to effect vaporization of the unaltered monomers. The vaporized unaltered monomers were separated from the reaction system and led to a condenser to be collected therein. The collection was continued smoothly. The collected monomers showed virtually no sign of polymer formation. The product extracted from the reaction device was sampled and analyzed for residual monomer content.

Subsequently, the reaction product emanating from a second vaporizing device was crushed by passage through a grinder (to a particle size distribution such that not less than 90% of the particles had diameters of not more than 2 mm) and, at the same time, made to add a varying basic gas or basic compound solution shown in Table 2 as an inactivating agent, and stirred at 80° C. for 30 minutes. Then, the resultant mixture and 0.5% of tetrakis-[methylene-3-(3,5-di-t-butyl-4-hydroxyphenyl)propionate] methane as a stabilizer, 0.1% of melamine, and 0.03% of magnesium oxide added thereto were stirred and mixed together for 5 minutes. The produced blend was placed in a biaxial extruding device provided with a vent, melted and mixed therein at a temperature of 210° C., and extruded under a vacuum degree of 5 mmHg in the vent part to produce pellets. The pellets were dried and tested for polymer quality. The results are shown in Table 2.

3. The process as claimed in claim 2, wherein the heteropolyacids are represented by the following formula (1):

$$H_x[M_m \cdot M'_n O_l] \cdot yH_2O \tag{1}$$

wherein M represents at least one central element selected from the group consisting of P and Si; M' represents at least one coordination element selected from the group consisting

TABLE 2

| | Polymerization conditions | | Unaltered monomers | Inactivating agent | | Quality of extruded pellets | | |
|---|---|---|---|---|---|---|---|---|
| | Catalyst (A) | Amount (ppm; based on total amount of monomers) | Conversion (%) | Residual monomers (%; based on total amount of monomers) | Kind | Amount (%, based on total amount of monomers) | MI (g/10 min.) | Alkali decomposition ratio (%) | Weight loss by heating (%) |
| Ex. 10: | HPA-1 | 3 | 81 | 1 | Ammonia gas | 0.1 | 5.8 | 0.32 | 0.29 |
| Ex. 11: | HPA-1 | 3 | 81 | 1 | Methyl amine gas | 0.5 | 6.0 | 0.34 | 0.32 |
| Ex. 12: | HPA-1 | 3 | 81 | 1 | Aqueous 10% ammonia solution | 1.0 | 5.7 | 0.32 | 0.28 |
| Ex. 13: | HPA-1 | 3 | 81 | 1 | Aqueous 5% triethyl amine solution | 1.0 | 6.0 | 0.35 | 0.32 |
| Ex. 14: | HPA-1 | 3 | 81 | 1 | Aqueous 0.1% calcium hydroxide solution | 3.0 | 6.2 | 0.36 | 0.31 |
| Ex. 15: | IPA-1 | 4 | 76 | 2 | Aqueous 10% ammonia solution | 1.0 | 6.4 | 0.35 | 0.32 |
| Comp. Ex. 3: | HPA-1 | 3 | 81 | No recovery attempted (10<) | Aqueous 10% ammonia solution | 1.0 | Unextrudable because of excessive residual monomer | | |
| Comp. Ex. 4: | BF₃ | 40 | 80 | Unrecoverable (10<) | Aqueous 10% ammonia solution | 1.0 | | | |

As is clear from the description given above and the working examples cited above, the process for production according to this invention permits a polyacetal copolymer excellent in such qualities as thermal stability to be produced economically by a simple procedure as compared with the conventional method.

We claim:

1. A process for producing a polyacetal copolymer comprising the steps of:
  (A) copolymerizing, under polyacetal copolymerization conditions, a polymerization system comprised of trioxane monomer with a cyclic ether or a cyclic formal having at least one carbon—carbon bond in the presence of a protonic acid polymerization catalyst which is non-vaporizable under conditions of steps (A), (B) and (C), until reaching a polymerization degree of at least 60%, based on all monomers, to thereby obtain a reaction product mixture comprised of crude polyacetal copolymer, unreacted monomers and polymerization catalyst, and then subsequently
  (B) causing the unreacted monomers in the reaction product mixture to vaporize, and
  (C) separating the vaporized unreacted monomers from the reaction product mixture to thereby reduce the remaining monomer content thereof to 5% by weight or less based on the weight of the crude polyacetal copolymer therein.

2. The process as claimed in claim 1, wherein the protonic acid polymerization catalyst is at least one catalyst selected from the group consisting of heteropolyacids, isopolyacids, and acid salts thereof.

of W, Mo, and V; l is 10 to 100; m is 1 to 10; n is 6 to 40; x is an integer of 1 or larger; and y is 0 to 50.

4. The process as claimed in claim 2, wherein the heteropolyacid or acid salt thereof is at least one compound selected from the group consisting of phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, silicomolybdotungstovanadic acid and acid salts of these.

5. The process as claimed in claim 2, wherein the isopolyacids and acid salts thereof are represented by the following formulas (2) or (3):

$$XM'_2O \cdot pM^V_2O_5 \cdot yH_2O \tag{2}$$

$$xM'_2O \cdot pM^{VI}O_3 \cdot yH_2O \tag{3}$$

wherein M' is hydrogen or may be partly replaced by a metal; $M^V$ is V, Nb, or Ta, each belonging to Group V of the Periodic Table; $M^{VI}$ is Cr, Mo, W, or U, each belonging to Group VI of the Periodic Table; p is an integer of 1 or larger; x is an integer of 1 or larger; and y is a number of 0 to 50.

6. The process as claimed in claim 2, wherein the isopolyacid or acid salt thereof is selected from the group consisting of paratungstic acid, metatungstic acid, paramolybdic acid, metamolybdic acid, paravanadic acid, metavanadic acid and an acid salt of any of these.

7. The process as claimed in claim 1, wherein the polymerization system comprises at least one comonomer selected from the group consisting of 1,3-dioxolane, diethylene glycol formal, 1,4-butanediol formal and ethylene oxide.

8. The process as claimed in claim 1, wherein step (B) includes at least one of subjecting the polymerization system to vacuum suction, contacting the polymerization system with an inert gas or a combination of both subjecting the polymerization system to vacuum suction and contacting the polymerization system with an inert gas.

9. The process as claimed in claim 1, which includes a continuous polymerizer provided at or around a discharge port thereof with a mechanism for vacuum suction or a mechanism for passing an inert gas to vaporize and remove unreacted monomers from a discharged polymer mixture and to separate unreacted monomers to thereby reduce the monomer content of the discharged polymer mixture to 5% by weight of lower.

10. The process as claimed in claim 1, wherein step (A) includes providing a first-stage polymerizer and conducting polymerization therein until the conversion reaches 60% or higher based on all monomers, and then further continuing the polymerization in at least one next-stage polymerizer while simultaneously practicing steps (B) and (C) in said at least one next-stage polymerizer to thereby discharge the reaction product mixture therefrom having a residual monomer content of 5% by weight or less.

11. The process as claimed in claim 1, wherein, after step (A), there is practiced the step of (A1) subjecting the reaction product mixture to granulation until at least 90% of crude polyacetal copolymer particles have a particle diameter of 3 mm or smaller.

12. The process as claimed in claim 1, which further comprises recycling the separated unreacted monomers obtained according to step (C) to the copolymerization step (A).

13. The process as claimed in claim 1, which further comprises the step of (D) adding a basic substance as a catalyst deactivator to the reaction product mixture having a residual monomer content of 5% by weight or less, to thereby allow the basic substance to contact the crude polyacetal copolymer therein and deactivate the polymerization catalyst.

14. The process as claimed in claim 13, wherein step (D) is practiced by adding a basic gas as the catalyst deactivator to the reaction product mixture.

15. The process as claimed in claim 14, wherein the basic gas used as the catalyst deactivator is ammonia and/or an amine compound having a boiling point of 150° C. or lower.

16. The process as claimed in claim 13, wherein step (D) is practiced by adding a basic compound solution as the deactivator to the reaction product mixture.

17. The process as claimed in claim 16, wherein the basic compound solution is comprised of at least one basic compound selected from the group consisting of ammonia, amine compounds, and oxides, hydroxides, inorganic acid salts and organic acid salts of alkali and alkaline earth metals.

18. The process as claimed in claim 13, wherein, prior to step (D), there is practiced the step of (A1) subjecting the reaction product mixture to granulation until at least 90% of crude polyacetal copolymer particles have a particle diameter of 3 mm or smaller.

19. The process as claimed in claim 1, wherein step (B) includes the steps of (B1) discharging the reaction product mixture, and then (B2) causing the unreacted monomers in the discharged reaction mixture to vaporize.

20. The process as claimed in claim 19, wherein step (B) includes subjecting the discharged reaction product mixture to vacuum suction.

21. The process as claimed in claim 19 or 20, wherein step (B) includes passing an inert gas through the discharged reaction product mixture.

22. The process of claim 17, wherein the basic compound solution is an aqueous solution.

23. The process of claim 17, wherein the basic compound solution is an organic solvent solution.

24. The process of any one of claims 14 or 15, which further comprises, after step (D), the step of (E) melting the crude polyacetal copolymer without washing the same.

25. The process as claimed in claim 24, wherein melting the crude polyacetal copolymer according to step (E) is conducted in the presence of at least one stabilizer selected from the group consisting of antioxidants, nitrogen-containing compounds, metal oxides and fatty acid salts.

26. The process as claimed in claim 24, wherein melting the crude polyacetal copolymer according to step (E) is conducted in the presence of water in an amount of 0.1 to 7% by weight, based on the crude polyacetal copolymer.

27. The process of claim 16 or 17, wherein the basic compound solution is used in an amount of 0.3 to 7% by weight, based on the crude polyacetal copolymer.

28. The process of claim 27, which further comprises, after step (D), the step of (E) melting the crude polyacetal copolymer without washing the same.

29. The process of claim 11, wherein steps (A1) and (B) are practiced at the same time.

* * * * *